Nov. 30, 1965     J. C. MARTIN     3,220,334
COFFEE MAKING MACHINE
Filed Oct. 2, 1963     2 Sheets-Sheet 1
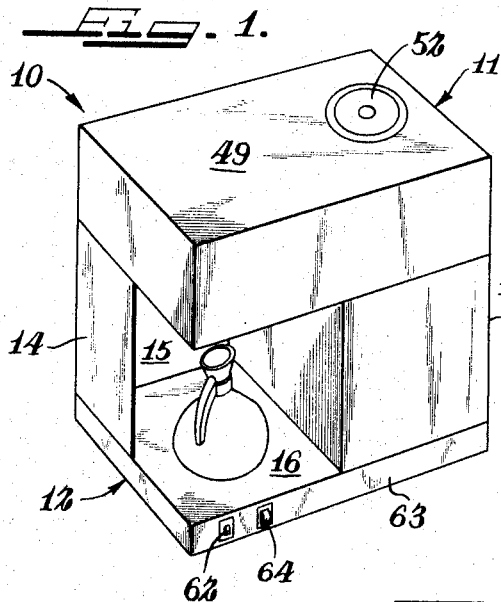
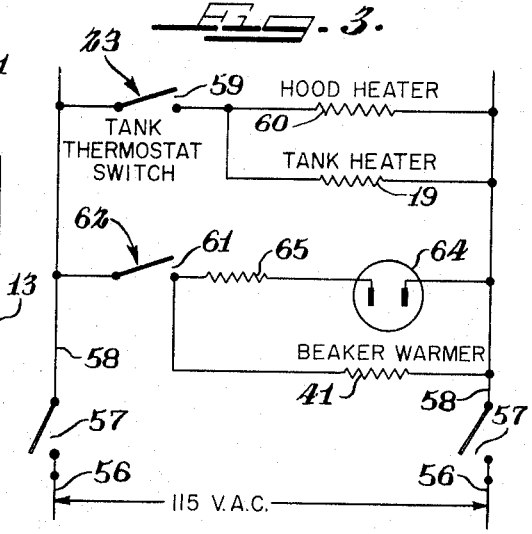
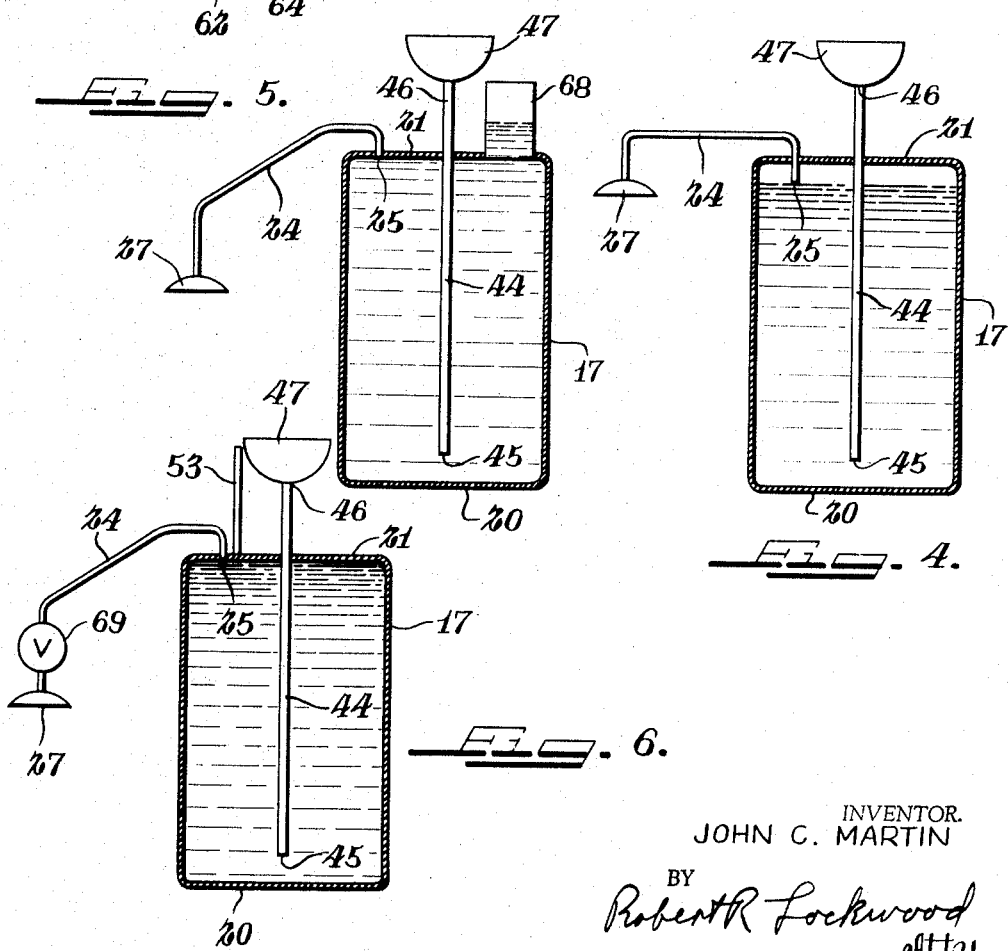
INVENTOR.
JOHN C. MARTIN
BY Robert R Lockwood
Atty.

Nov. 30, 1965  J. C. MARTIN  3,220,334
COFFEE MAKING MACHINE
Filed Oct. 2, 1963  2 Sheets-Sheet 2
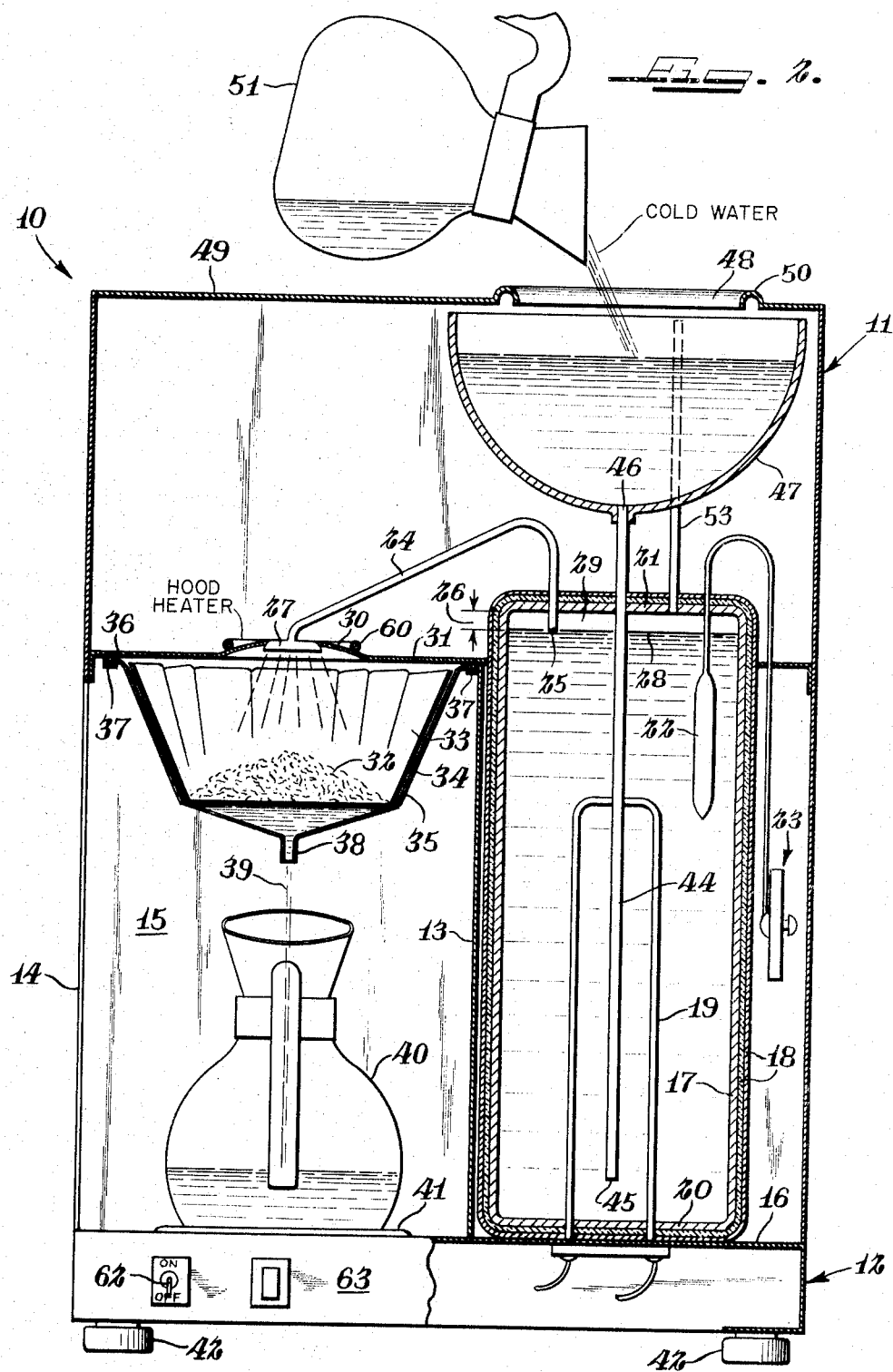

3,220,334
COFFEE MAKING MACHINE
John C. Martin, Springfield, Ill., assignor, by mesne assignments, to Bunn-O-Matic Corporation, Springfield, Ill., a corporation of Delaware
Filed Oct. 2, 1963, Ser. No. 313,314
4 Claims. (Cl. 99—282)

This invention relates, generally, to beverage making apparatus of the infusive contact type and it has particular relation to coffee making machines. It constitutes an improvement over U.S. George R. Bunn Patent No. 3,034,417, issued May 15, 1962, and my application Serial No. 208,828, filed July 10, 1962, now abandoned.

Among the objects of this invention are: To provide an instantaneous supply of hot water in a tank for beverage, such as coffee, making purposes normally disassociated with a water supply, such as a supply of water under pressure, and to displace a quantity of the hot water by pouring the same quantity of water, such as cold water, into the water tank at its lower end; to provide for introducing the cold water at the lower end of the water tank through an inlet water line that opens to the atmosphere above the top of the water tank; to connect the bottom of a basin to the open end of the water line into which the water for displacing the hot water can be poured manually; to connect a discharge head to the upper end of the water tank for receiving hot water therefrom and distributing it over ground coffee to cause coffee extract to flow into a beaker therebelow; to enclose the upper end of the water tank and the discharge head in a hood with an opening being provided therein through which the cold water can be poured into the basin; to heat the hood in the vicinity of the discharge head in order to prevent moisture condensation; to vent the upper end of the water tank to the atmosphere in order to facilitate entry of the cold water to displace the hot water; to provide a standpipe at the upper end of the water tank in lieu of an air space within the tank; and to interpose a valve in the discharge water line that interconnects the water tank and the discharge head.

In the drawings:

FIG. 1 is a perspective view of a machine for making coffee extract that embodies this invention.

FIG. 2 is a vertical sectional view, at an enlarged scale, showing the internal details of construction of the machine illustrated in FIG. 1.

FIG. 3 shows diagrammatically the circuit connections that can be employed for the coffee making machine.

FIGS. 4, 5 and 6 show certain modifications of the connections to the water tank.

Referring now particularly to FIGS. 1 and 2 of the drawings, it will be noted that the reference character 10 designates, generally, a machine for making coffee extract. The machine 10 includes an upper cabinet or hood 11 that is relatively thick, a lower cabinet 12 that is relatively thin, a water tank enclosure 13 therebetween together with a side wall 14 and a rear wall 15. The cabinets 11 and 12, water tank enclosure 13, and walls 14 and 15 preferably are formed of corrosion resisting material such as stainless steel.

Mounted on the upper wall 16 of the lower cabinet 12 is a water tank 17 that is provided with a covering 18 of insulation to prevent heat loss from water that normally is maintained at a relatively high temperature by a heating element 19 which, as will be described hereinafter, is connected for energization to a suitable electric current source. The heating element 19 extends upwardly from the lower end 20 of the water tank 17 and is arranged to be energized in such manner as to maintain a constant supply of hot water in the water tank 17.

Near the upper end 21 of the water tank 17 there is positioned a temperature responsive element 22 that extends outwardly of the water tank 17 for controlling the operation of a tank thermostat switch 23 in a conventional manner. The arrangement is such that water in the water tank 17 is maintained at an elevated temperature constantly. This makes it possible to promptly draw off a supply of hot water from the upper end of the water tank 17 for the purpose of making coffee extract in a manner to be described.

The hot water is drawn off through a discharge water line 24 with the arrangement being such that the hot water is siphoned out of the upper end of the water tank 17. One end 25 of the discharge water line 24 is preferably located at a distance indicated at 26 below the upper end 21. At its other end the discharge water line 24 is connected to a discharge head 27 that is provided with a plurality of openings for causing the hot water to spray downwardly as indicated. Near the end of the coffee extract making operation the hot water at the upper end of the water tank 17 continues to flow until the water level, as indicated by the broken line at 28, coincides with the end 25 of the discharge water line 24. When this occurs a space 29 filled with air is provided above the level 28 of the hot water in the tank 17. For each instance of the coffee extracting operation the flow of hot water stops when the water level reaches the position indicated by the line at 28. This insures that the amount of hot water discharged is always equal to the amount of cold water that is poured into the basin 47. This equality provides a ready means for predetermining the amount of coffee extract which will be produced by measuring the amount of cold water being introduced. This might, for example, be varied from approximately 2 to 12 cups.

It will be noted that the discharge head 27 is located underneath an upwardly deformed portion 30 of a bottom wall 31 of the upper cabinet or hood 11. The discharge head 27 causes the hot water to be distributed over ground coffee 32 that is positioned on the bottom of a cup shaped member 33 of filter paper which is positioned on a wire grill 34 and thus spaced from the inner surface of a funnel 35. The funnel 35 is provided with a radially extending annular flange 36 that is arranged to slide along angles 37—37 which are secured to the underside of the bottom wall 31. This construction permits removal of the funnel 35 for removal of the member 33 of filter paper and the spent coffee grounds and replacement thereof.

The funnel 35 is provided on the under side with a discharge spout 38 through which coffee extract 39 flows into a beaker 40 located therebelow. The beaker 40 is positioned on a beaker warmer 41 that is carried by the upper wall 16 of the lower cabinet 12. Support feet 42—42 depend from the under side of the lower cabinet 12 for suitably supporting the machine 10 on a flat surface.

In accordance with this invention provision is made for displacing a quantity of hot water at the upper end of the water tank 17 by introducing into the water tank 17 an equal amount of water, preferably cold water. For this purpose an inlet water line 44 is employed. As seen in FIG. 2 the inlet water line 44 extends downwardly through the upper end 21 of the water tank 17. Its lower end 45 is near the lower end 20 of the water tank 17. Thus the incoming cold water enters near the bottom of the water tank 17 and does not directly mix with the hot water at the top of the water tank 17 which is displaced and is transferred by the discharge water line 24 to the discharge head 27 for making the coffee extract 39. The upper end 46 of the inlet water line 44 extends above the upper end 21 of the water tank 17 and into the bottom of a basin 47 which has a liquid capacity somewhat in excess of the liquid capacity of the beaker 40.

The basin 47 is located within the upper cabinet or hood 11 in which the upper end of the water tank 17 and the discharge head 27 are located. In order to permit cold water to be poured into the basin 47 it is positioned underneath an opening 48 in the top wall 49 of the upper cabinet or hood 11. The periphery of the opening 48 is formed by a rolled section 50 of the top wall 49. Cold water from a beaker 51 is poured through the opening 48 into the basin 47. By providing predetermined amounts of ground coffee 32 on the member 33 of filter paper and maintaining the temperature of the water in the water tank 17 at a predetermined value, it is possible to make the coffee extract 39 under identical controlled conditions for each coffee making cycle.

If desired, a cover 52, FIG. 1, can be employed for closing the opening 48 in the top wall 49 of the upper cabinet 11 when the basin 47 is not to receive a supply of cold water from the beaker 51.

With a view to making certain that the cold water in the basin 47 flows freely into the water tank 17, a vent tube 53 is employed. It extends through the upper end 21 of the water tank 17 and to a point above the highest level of the water in the basin 47. The vent tube 53 places the space 29 in direct communication with the atmosphere and provides for the escape of air from the upper end of the water tank 17 to permit the ingress of the cold water from the basin 17 downwardly through the inlet water line 44.

FIG. 3 shows the electrical connection for the coffee extract making machine 10. Here it will be observed that the supply conductors are indicated at 56—56 which may be the conventional conductors energized at 115 volts from a suitable alternating current source. Switches 57—57 can be provided for interconnecting conductors 56—56 with load conductors 58—58. It will be understood that the switches 57—57 may represent a conventional plug the terminals of which are connected to the load conductors 58—58 and are arranged to be inserted in a conventional wall socket or receptacle that is energized from the supply conductors 56—56. The tank heater 19 is arranged to be connected through contacts 59 of the tank thermostat switch 23 and across the conductors 58—58. In parallel with the tank heater 19 is a hood heater 60. As shown in FIG. 2 the hood heater 60 overlies the upwardly deformed portion 30 of the bottom wall 31 of the upper cabinet or hood 11. The purpose of the hood heater 60 is to prevent the condensation of moisture in the vicinity of the discharge head 27.

The beaker warmer 41 is arranged to be energized when contacts 61 of a control switch, shown generally at 62, are closed. The control switch 62 is mounted on the front walls 63, FIGS. 1 and 2, of the lower cabinet 12. In order to indicate that the beaker warmer 41 is energized a gas filled indicating lamp 64 is connected through a ballast resistor 65 for energization on closure of the contacts 61.

In operation it will be assumed that the water tank 17 is filled with water to the level indicated at 28 and that the switches 57—57 are closed to place the tank heater 19 and hood heater 60 under the control of the contacts 59 of the tank thermostat switch 23. These contacts are closed and opened under the control of the temperature responsive element 22 in such manner as to maintain the temperature of the water in the water tank 17 in the neighborhood of 200° F. Experience indicates that only a relatively small amount of electrical energy is required for maintaining the water in the water tank 17 of moderate size at the desired temperature on a continuous basis. The water vapor does not escape but rather condenses on the inner surface of the water tank 17 and returns to the main body of water.

When it is desired to cause coffee extract 39 to flow into the beaker 40, the latter is positioned on the beaker warmer 41 and the control switch 62 is closed to energize the beaker warmer 41. The energization of the indicating lamp 64 then indicates that this action has taken place.

A supply of fresh ground coffee 32 is placed on the member 33 of filter paper which is located on the wire grill in funnel 35. Then the funnel 35 is inserted underneath the discharge head 27. Next the cover 52 is removed and the contents of beaker 51 are poured into the basin 47. The cold water from the basin 47 flows downwardly through the inlet water line 44 and discharges into the lower end of the water tank 17. The water level 28 then rises in the downturned end of the discharge water line 24 and in the vent tube 53 until it starts to flow through the discharge water line 24 to the discharge head 27. The hot water then is sprayed by the discharge head 27 over the ground coffee 32 and the coffee extract 39 flows into the beaker 40. The flow of hot water through the discharge water line 24 continues until all of the water in the basin 47 has flowed into the lower end of the water tank 17 and until the water in the space 29 has been siphoned out by the discharge water line 24. When this occurs, further flow of hot water through the discharge water line 24 promptly ceases and there is no following drip from the discharge head 27.

FIG. 4 shows diagrammatically an arrangement for insertion in the machine 10 without the use of the vent tube 53. In this embodiment the inlet water line 44 takes the place of the vent tube 53. In such an arrangement the capacity of the discharge water line 24 and the discharge head 27 is such as to readily facilitate the flow of water from the basin 47 into the water tank 17. When such an arrangement is not employed, it is desirable to use the vent tube 53 as described.

In FIG. 5 it will be observed that the end 25 of the discharge water line 24 terminates flush with the under side of the upper end 21 of the water tank 17. In this arrangement, instead of providing for the space 29 in the upper end of the water tank 17, a standpipe 68 is employed. As shown, it opens into the interior of the water tank 17 through the upper end 21 thereof. The level of the water in the standpipe 68 then changes depending upon the level of the water in the basin 47. It will be understood that the construction shown in FIG. 5 can be substituted for that shown in FIG. 2.

In FIG. 6 there is shown still another arrangement that can be substituted for the construction shown in FIG. 2. Here it will be observed that a shut off valve 69 is interposed in the discharge water line 24. This makes it possible to shut off manually the flow of hot water through the discharge water line 24 as and when desired.

In any of the several embodiments of the invention shown it will be observed that the interior of the water tank 17 is in direct communication with the atmosphere. Thus it is not possible for pressure to be built up within the water tank 17 under normal operating conditions.

I claim:

1. A machine for making varying amounts of coffee extract of the order of 2 to 12 cups without requiring adjustment be made of the machine, said machine comprising:

(a) a water tank closed at its upper end,
 (b) means for heating water in said tank,
 (c) a discharge head mounted in spaced relation to said water tank,
 (d) a discharge water line uninterruptedly interconnecting the upper end of said water tank and said discharge head,
 (e) means underneath said discharge head for receiving ground coffee to be covered by hot water from said discharge head,
 (f) a coffee beaker below said coffee receiving means for receiving coffee extract therefrom,
 (g) an inlet water line communicating with said water tank near its bottom and open to the atmosphere above its upper end,
 (h) a basin open at its top and connected at its bottom to said upper end of said inlet water line, and
 (i) hood means enclosing the upper end of said water tank and said basin, (j) said hood means having an opening registering with the open top of said basin whereby a manually manipulable cold water beaker may be employed for pouring a predetermined quantity of cold water through said opening into said basin to flow by gravity into the bottom portion of said water tank in an amount substantially equal to the amount of hot water to be displaced at the top of said water tank to cause said hot water to flow through said discharge water line to cover said ground coffee and to cause coffee extract to flow into said coffee beaker in an amount corresponding to that amount of cold water initially in said cold water beaker.

2. A machine for making varying amounts of coffee extract of the order of 2 to 12 cups without requiring adjustment be made of the machine, said machine comprising:

(a) a water tank closed at its upper end,
(b) means for heating water in said tank,
(c) a discharge head mounted in spaced relation to said water tank,
(d) a discharge water line uninterruptedly interconnecting the upper end of said water tank and said discharge head,
(e) means underneath said discharge head for receiving ground coffee to be covered by hot water from said discharge head,
(f) a coffee beaker below said coffee receiving means for receiving coffee extract therefrom,
(g) an inlet water line communicating with said water tank substantially below its upper end and open to the atmosphere above its upper end,
(h) a basin open at its top and connected at its bottom to said upper end of said inlet water line having a liquid capacity slightly in excess of the liquid capacity of said coffee beaker, and
(j) hood means enclosing the upper end of said water tank and said basin,
(j) said hood means having an opening registering with the open top of said basin whereby a manually manipulable cold water beaker may be employed for pouring a predetermined quantity of cold water through said opening into said basin to flow by gravity into the bottom portion of said water tank in an amount substantially equal to the amount of hot water to be displaced at the top of said water tank to cause the same to flow through said discharge water line to cover said ground coffee and to cause coffee extract to flow into said coffee beaker in an amount corresponding to the amount of cold water initially in said cold water beaker.

3. A machine for making varying amounts of coffee extract of the order of 2 to 12 cups without requiring adjustment be made of the machine, said machine comprising:

(a) a water tank closed at its upper end,
(b) means for heating water in said tank,
(c) a discharge head mounted in spaced relation to said water tank,
(d) a discharge water line interconnecting the upper end of said water tank and said discharge head,
(e) means underneath said discharge head for receiving ground coffee to be covered by hot water from said discharge head,
(f) a coffee beaker below said coffee receiving means for receiving coffee extract therefrom,
(g) an inlet water line communicating with said water tank near its bottom and open to the atmosphere above its upper end,
(h) a basin open at its top and connected at its bottom to said upper end of said inlet water line, and
(i) hood means enclosing the upper end of said water tank and said basin,
(j) said hood means having an opening registering with the open top of said basin whereby a manually manipulable cold water beaker may be employed for pouring a predetermined quantity of cold water through said opening into said basin to flow by gravity into the bottom portion of said water tank in an amount substantially equal to the amount of hot water to be displaced at the top of said water tank to cause said hot water to flow through said discharge water line to cover said ground coffee and to cause coffee extract to flow into said coffee beaker in an amount corresponding to that amount of cold water initially in said cold water beaker.

4. A machine for making varying amounts of coffee extract of the order of 2 to 12 cups without requiring adjustment be made of the machine, said machine comprising:

(a) a water tank closed at its upper end,
(b) means for heating water in said tank,
(c) a discharge head mounted in spaced relation to said water tank,
(d) a discharge water line interconnecting the upper end of said water tank and said discharge head, and valve means in said line for controlling flow of water therethrough,
(e) means underneath said discharge head for receiving ground coffee to be covered by hot water from said discharge head,
(f) a coffee beaker below said coffee receiving means for receiving coffee extract therefrom,
(g) an inlet water line communicating with said water tank substantially below its upper end and open to the atmosphere above its upper end,
(h) a basin open at its top and connected at its bottom to said upper end of said inlet water line having a liquid capacity slightly in excess of the liquid capacity of said coffee beaker, and
(i) hood means enclosing the upper end of said water tank and said basin,
(j) said hood means having an opening registering with the open top of said basin whereby a manually manipulable cold water beaker may be employed for pouring a predetermined quantity of cold water through said opening into said basin to flow by gravity into the bottom portion of said water tank in an amount substantially equal to the amount of hot water to be displaced at the top of said water tank to cause the same to flow through said discharge water line to cover said ground coffee and to cause coffee extract to flow into said coffee beaker in an amount corresponding to the amount of cold water initially in said cold water beaker.

References Cited by the Examiner

UNITED STATES PATENTS

| | | | |
|---|---|---|---|
| Re. 25,663 | 10/1964 | Bunn | 99—282 |
| 2,737,880 | 3/1956 | Johnson | 99—282 X |
| 2,755,733 | 7/1956 | Arosio et al. | 99—305 X |
| 3,034,417 | 5/1962 | Bunn | 99—283 |
| 3,133,671 | 5/1964 | Christine et al. | 222—146 X |

FOREIGN PATENTS 440,954   5/1912   France.

WALTER A. SCHEEL, *Primary Examiner.*